United States Patent
Kaltenbach

(10) Patent No.: US 8,589,005 B2
(45) Date of Patent: Nov. 19, 2013

(54) METHOD FOR OPERATING A DRIVE TRAIN

(75) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 164 days.

(21) Appl. No.: 13/143,742

(22) PCT Filed: Jan. 29, 2010

(86) PCT No.: PCT/EP2010/051051
§ 371 (c)(1),
(2), (4) Date: Jul. 8, 2011

(87) PCT Pub. No.: WO2010/089246
PCT Pub. Date: Aug. 12, 2010

(65) Prior Publication Data
US 2011/0282533 A1    Nov. 17, 2011

(30) Foreign Application Priority Data
Feb. 9, 2009 (DE) .................. 10 2009 000 720

(51) Int. Cl.
*G05D 1/00* (2006.01)
*B60L 11/00* (2006.01)

(52) U.S. Cl.
USPC .................. 701/22; 180/65.285; 903/946

(58) Field of Classification Search
USPC ............. 701/22; 180/65.275, 65.285, 65.265; 903/946; 318/400.15, 400.21
See application file for complete search history.

(56) References Cited

U.S. PATENT DOCUMENTS

| 5,681,242 | A | 10/1997 | Bates |
| 5,934,398 | A * | 8/1999 | Hotta .......................... 180/65.8 |
| 6,808,470 | B2 * | 10/2004 | Boll ................................ 477/6 |
| 7,237,634 | B2 * | 7/2007 | Severinsky et al. ........ 180/65.23 |
| 8,113,309 | B2 * | 2/2012 | Allgaier ................... 180/65.265 |
| 8,132,635 | B2 * | 3/2012 | Fujimoto et al. ......... 180/65.285 |
| 2002/0014872 | A1 * | 2/2002 | Morimoto et al. ............ 318/445 |
| 2004/0065490 | A1 * | 4/2004 | Saito et al. .................... 180/65.1 |
| 2004/0099454 | A1 | 5/2004 | Hughes |
| 2007/0112496 | A1 | 5/2007 | Ji |
| 2011/0053734 | A1 * | 3/2011 | Kaltenbach et al. .............. 477/5 |
| 2012/0130579 | A1 * | 5/2012 | Steuernagel et al. ........... 701/22 |

FOREIGN PATENT DOCUMENTS

| DE | 10 2006 029 366 A1 | 1/2008 |
| EP | 0 731 294 A2 | 9/1996 |
| EP | 1 522 450 A2 | 4/2005 |
| GB | 2 435 102 A | 8/2007 |

* cited by examiner

*Primary Examiner* — John Q Nguyen
*Assistant Examiner* — Brian J Broadhead
(74) *Attorney, Agent, or Firm* — Davis & Bujold, PLLC; Michael J. Bujold

(57) ABSTRACT

A method of operating a drive train of a motor vehicle which includes at least an electric machine, as a drive aggregate, and a transmission which is positioned between the drive aggregate and an output, and a starting element positioned between the electric machine and the transmission. For and during the start, an expected drive resistance is calculated and then, if the expected drive resistance is lower than a first threshold value, starting takes place with the starting element engaged via the electric machine from a standstill, and if the expected drive resistance is larger than the first threshold value, starting takes place with the starting element disengaged, the electric machine is operated with a defined machine rotational speed in a rotation speed control mode, and thereafter, the starting element is engaged such that it transfers starting torque which depends on the a driver request.

8 Claims, 1 Drawing Sheet

METHOD FOR OPERATING A DRIVE TRAIN

This application is a National Stage completion of PCT/EP2010/051051 filed Jan. 29, 2010, which claims priority from German patent application serial no. 10 2009 000 720.2 filed Feb. 9, 2009.

FIELD OF THE INVENTION

The invention relates to a method for operating a drive train of a motor vehicle.

BACKGROUND OF THE INVENTION

The main components of a drive train of a motor vehicle are a drive aggregate and a transmission. The transmission changes rotational speed and torque, thus providing a traction force by the drive aggregate to the output of the drive train. The present invention relates to a method for operating a drive train were the drive aggregate comprises at least an electric machine. The inventive method is therefore applicable in a pure electric vehicle, in which the drive aggregate is exclusively an electric machine, as well as for a hybrid vehicle in which the drive aggregate is an electric machine and a combustion engine. The electric machine of the respective drive aggregate is hereby, for instance, designed as a three-phase current synchronous machine.

In a three-phase current synchronous machine, the rotational speed of a rotor corresponds to the rotational speed of a rotating electromagnetic field, thus concluding that the rotor of such a synchronous machine rotates synchronously to the rotating field. A three-phase current synchronous machine, were the rotating field is generated by means of a frequency converter, has therefore no slippage. At that time, when the rotor of the three-phase current synchronous machine is at stand still, mainly just one phase of the synchronous machine has a current flow through it, thus causing a one-sided stress of the related components of the power electronic in the frequency converter. The frequency converter of a three-phase current synchronous machine comprises mainly a rectifier, which represents an interface to a DC intermediate circuit, or DC voltage intermediate circuit, respectively, as well as of an inverter which is fed from this DC intermediate circuit or DC voltage intermediate circuit, respectively.

The inverter comprises switching transistors and generates a pulse width modulated voltage. The inductance of the electric machine creates a smoothing of the current, whereby the amplitude of the resulting output voltage and its frequency can be regulated.

At the time, when a three-phase current synchronous machine is at standstill, its maximal available torque is, for a defined time interval, less than with a rotating synchronous machine, because the components of the power electronics in the frequency converter in a rotating synchronous machine are alternately charged. However, at its stand still, the power electronics are strained one-sided which can cause overheating and thus damage to the power electronics of the frequency converter of the synchronous machine. This causes difficulties during the start of a motor vehicle where the drive aggregate is an electric machine which comprises a three-phase current synchronous machine. Therefore, there exists a need for a method to operate a drive train of a motor vehicle, through which on one hand reliable starting can be realized, and through which on the other hand an overload and thus damage of the electric machine, designed as a three-phase current synchronous machine, can be avoided.

SUMMARY OF THE INVENTION

Based on the above, the present invention addresses the problem to create a novel method for operating a drive train of a motor vehicle.

According to the invention, an expected drive resistance for the start is calculated at the time of the start. If the expected drive resistance is lower than a first threshold value, the start happens with an engaged, transmission external or transmission internal, starting element through the electric machine which is here at a standstill.

At the time, when the expected drive resistance is larger than the first threshold value, initially the electric machine is, with a disengaged, transmission external or transmission internal driving element, operated with a defined machine rotational speed in a rotation speed control mode, and thereafter the transmission external or transmission internal driving element is engaged in a way that it transfers a starting torque which is dependent on the request of the driver.

In accordance with the invention, the method enables safe and reliable starting of a drive train of a motor vehicle were the drive aggregate comprises of an electric machine which is designed as a synchronous machine, specifically as a three-phase current synchronous machine.

During the start, overheating or overloading, respectively, and therefore damage of the power electronics of the electric machine can be avoided.

BRIEF DESCRIPTION OF THE DRAWINGS

One embodiment of the invention, without being limited to it, is further explained through the drawings. These show:

FIG. 1 a schematic drive train of a motor vehicle to which the invented method can be applied to;

FIG. 2 an additional schematic drive train of a motor vehicle to which the invented method can be applied to.

DETAILED DESCRIPTION OF THE PREFERRED EMBODIMENTS

Figure 1:
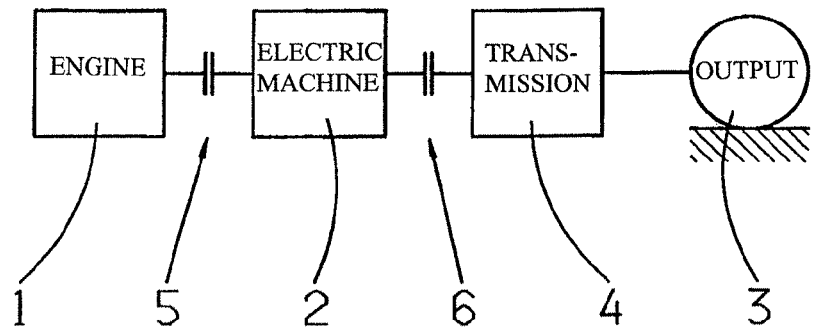
Figure 2:
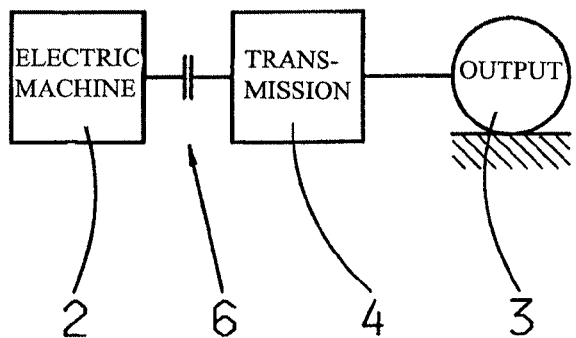

The present invention relates to a method to operate a drive train of a motor vehicle, whereby FIG. 1 and FIG. 2 each show an example of a drive train to which the inventive method can be applied.

Thus, FIG. 1 shows in a simple schematic, a drive train of a so-called parallel hybrid drive, in which the drive train in FIG. 1 comprises a drive aggregate with a combustion engine 1 and an electric machine 2. Between the drive aggregate, that is to say between the electric machine 2 and the output 3, a transmission 4 is positioned, the transmission 4 is preferably designed as an automatic transmission.

In accordance with FIG. 1, a clutch 5 is positioned between the combustion engine 1 and the electric machine 2 of the drive train, in which an additional clutch 6 is positioned between the electric machine 2 and the transmission 4. The clutch 6, between the electric machine 2 and the transmission 4, provides a transmission external starting element. Instead of such transmission external starting element, the drive train of FIG. 1 can also have a transmission internal starting element.

FIG. 2 schematically shows a drive train of a pure electric vehicle, in which the drive aggregate comprises exclusively an electric machine 2, but not a combustion engine. Also in FIG. 2, again between the electric machine 2 and an output 3, a transmission 4 of any design is here positioned, in which again a transmission external starting element 6 is positioned between the electric machine 2 and the transmission 4.

Instead of a transmission external starting element, the drive train as shown in FIG. 2 can also comprise of a transmission internal starting element.

As already presented, the invented method can be applied to a drive train of a hybrid vehicle as in FIG. 1, as well as to the drive train of a pure electric vehicle as in FIG. 2, in which the invention relates to starting of the drive train. The electric machine 2 of the respective drive trains is a synchronous machine, namely a three-phase current synchronous machine.

In terms of the invented method, an expected drive resistance is calculated for the starting of the respective drive train. The expected drive resistance needed to start can be calculated by measurements from slope angle sensors. It is also possible, as an alternative, to calculate the expected drive resistance based on the previous torque results and/or acceleration results of the drive train. Details, through which the drive resistance can be calculated, are known to an expert in the art and do not need to be explained further.

In accordance and in the terms of the present invention, the expected drive resistance for the start, which has been calculated in advance, is now compared to a threshold limit and based on it, the start procedure will be established.

When the expected drive resistance is lower than a first threshold limit, the drive train of FIG. 2 is started from its standstill with the electric machine 2 by engaging the starting element 6. It also applies to the drive train in FIG. 1, whereby in FIG. 1, in addition, the combustion engine 1 is turned off and the clutch 5 positioned between the combustion engine 1 and the electric machine 2 is disengaged.

It is hereby monitored whether the electric machine 2 reaches a minimum rotational speed. If it is determined that this minimum rotation speed has not been reached, the start procedure is terminated and a new start procedure is executed, namely with measurements which can be applied if the prior determined expected drive resistance for the start is larger than the first threshold value.

At the time, when the expected drive resistance is larger than the first threshold value, in reference to the drive train in FIG. 2 and during the start with a disengaged starting element 6, the electric machine 2 is operated with a defined machine rotational speed under rotation speed control mode, whereby the defined machine rotational speed is set above of a minimum rotational speed, at which the electric machine 2 can create a maximum possible torque for a defined time interval. As already mentioned, the electric machine 2 is hereby operated in a rotation speed control mode. Then, after the increase of the machine rotation speed to a defined machine rotational speed, the starting element 6 is engaged in a way such that it can transfer a torque which is desired by the driver. The same applies to the drive train in FIG. 1, whereby the combustion engine 1 in the drive train of FIG. 1 is also turned off and the clutch 5, positioned between the combustion engine 1 and the electrical machine 2, is disengaged.

Figure 3:
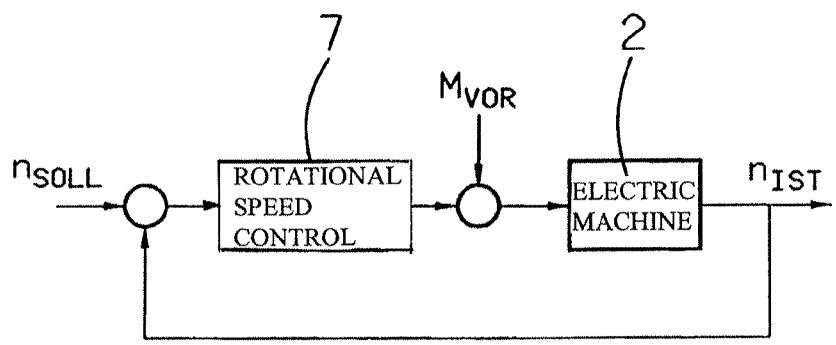
FIG. 3 a block diagram for the clarification of the aspects of the invented method.

As previously mentioned and at the time, when the expected drive resistance is larger than the first threshold value, the electric machine 2 is operated in a rotation speed control mode for the starting operation, the structure of the rotational speed control for the electric machine 2 is shown in FIG. 3. During the rotational speed control of the electric machine 2 in the rotation speed control mode, in accordance with FIG. 3, an actual rotational speed $N_{IST}$ of the electric machine 2 is compared to a nominal rotation speed $n_{SOLL}$ and a deviation is executed in a rotational speed control 7, which provides a torque as the control parameter for the electric machine 2.

The torque which is issued by the rotational speed control 7 is combined with a feed forward torque $M_{VOR}$, whereby the feed forward torque, in the rotation speed control mode, proceeds as the torque of the starting element 6.

In this case, and after the engagement of the starting element 6, the electric machine 2 is switched from the rotation speed control mode to a torque control mode and the starting operation continues with the stating element 6 engaged.

In the case in which the drive train according to FIG. 1 has a combustion engine 1 in an addition to an electric machine 2, the expected drive resistance is compared during the starting operation with two threshold values, namely with the already mentioned first threshold value and a second threshold value which is larger than the first threshold value. In this case, the expected drive resistance is not only larger than the first threshold value, but is also larger than the second threshold value, in the starting operation, with a disengaged starting element 6, the electric machine 2 is operated in the rotation speed control mode with a defined machine rotational speed, and thereafter, the starting element 6 is engaged so that it transfers a starting torque, whereby the combustion engine 1 in addition, by means of the clutch 5 which is operated in slippage mode and which is positioned between the combustion engine 1 and the electric machine 2, transfers an additional starting torque. In this case, the feed forward torque $M_{VOR}$ for the rotational speed control of the electric machine 2 is dependent on the torque of the starting element 6, as well as the torque from the clutch 5 which is positioned between the combustion engine 1 and the electric machine 2. Furthermore, the friction between the clutch 5 and the starting element 6 is split in this case. The clutch 5 has, due to the slippage of the starting element 6, a lower differential rotational speed then when the starting element 6 is completely engaged. The starting element 6 works with a lesser friction than in a situation in which the clutch 5 would be completely engaged.

The starting element 6, however, transfers an identical torque but it also adjusts to a lower differential rotational speed when the clutch 5 slips.

At the time when the expected drive resistance for the drive train, in accordance with FIG. 1, is larger than the first threshold value, but lower than the second threshold value, when the clutch 5 is disengaged and the starting element 6 is disengaged, the electric machine 2 is first brought to a defined machine rotational speed in the rotation speed control mode, and thereafter the starting element 6 is engaged in a way such that it transfers a desired starting torque whereby it is monitored whether the motor vehicle starts after a defined time interval. If it is recognized that the motor vehicle does not start, the start procedure is terminated and a new start procedure is executed with conditions which are applied if the expected drive resistance is larger than the second threshold value.

At the time, when the expected drive resistance for the drive train, in accordance with FIG. 1, is lower than the second threshold value and also lower than the first threshold value, the start from a standstill, as already mentioned, takes place via the electric machine 2 with the combustion engine 1 turned off, the clutch 5 disengaged, and the starting element 6 engaged, whereby it is then monitored whether, after a defined time interval, the electric machine 2 has reached a minimum rotational speed. If it is determined that the electric machine 2 has not reached a minimum rotational speed, the start procedure will be terminated and a new start procedure will be executed, namely either under conditions which can be applied if the expected drive resistance is larger than the first threshold value but lower than the second threshold value, or under conditions which can be applied if the expected drive resistance is larger than the second threshold value.

The invention has a vast number of advantages. A safe start of the motor vehicle can always be realized, i.e., without the danger of an overload and therefore damage to the electric machine, designed as a three-phase current synchronous machine. Furthermore, the maximum available torque of the electric machine 2 can be fully utilized. The starting element, which is designed as a transmission internal or transmission external starting element 6, undergoes just a low load and thus a low wear. If, when starting, the expected drive resistance is larger than the first threshold value, the start only takes place with a slipping transmission internal or transmission external starting element 6. However, if the expected drive resistance is lower than this threshold value, the starting element 6 remains engaged and is therefore not under load.

REFERENCE CHARACTERS

1 Combustion Engine
2 Electric Machine
3 Output
4 Transmission
5 Clutch
6 Starting Element
7 Rotational Speed Control

The invention claimed is:

1. A method of operating a drive train of a motor vehicle, the drive train comprising at least an electric machine (2) as a drive aggregate and a transmission (4) that is positioned between the drive aggregate and an output (3), a starting element (6) that is one of external and internal of the transmission (4) and positioned between the electric machine (2) and the transmission (4), the method comprising the steps of:
    calculating an expected drive resistance for starting during a starting procedure;
    if the expected drive resistance is lower than a first threshold value, carrying out the starting procedure, from a standstill, with the starting element (6) engaged via the electric machine (2); and
    if the expected drive resistance is larger than the first threshold value, carrying out the starting procedure with the starting element (6) disengaged and operating the electric machine (2), in a rotation speed control mode, at a defined machine rotation speed and, thereafter, engaging the starting element (6) such that the starting element (6) transfers a starting torque which depends on a request of a driver.

2. The method according to claim 1, further comprising the step of monitoring whether, after a defined time interval, the electric machine (2) reaches a minimum rotation speed, when the expected drive resistance is lower than the first threshold value, and
    carrying out the starting procedure with the starting element (6) engaged via the electric machine (2) from a standstill, and
    when the minimum rotation speed is not reached, terminating the start procedure and executing a new start procedure under conditions which are applied if the expected drive resistance is larger than the first threshold value.

3. The method according to claim 1, further comprising the step of carrying out the start starting procedure with the electric machine (2) in the rotation speed control mode, when the expected drive resistance is larger than the first threshold value, in which a torque of the starting element (6) determines a forward feed torque for the rotation speed control mode.

4. The method according to claim 1, further comprising the step of switching the electric machine (2) from the rotation speed control mode to a torque control mode, when the expected drive resistance is larger than the first threshold value and after the starting element (6) engages.

5. The method according to claim 1, further comprising the step of carrying out the starting procedure with the starting element (6) disengaged, when the drive aggregate comprises a combustion engine (1) in addition to the electric machine (2) and the expected drive resistance is larger than a second threshold value which is larger than the first threshold value, by operating the electric machine (2) at the defined machine rotation speed in the rotation speed control mode, and,
    thereafter, engaging the starting element (6) such that the starting element (6) transfers a starting torque, the combustion engine (1) transferring an additional starting torque of a clutch (5) which is operated in slippage mode and which is positioned between the combustion engine (1) and the electric machine (2).

6. The method according to claim 5, further comprising the step of carrying out the starting procedure, when the expected drive resistance is larger than the second threshold value, and operating the electric machine (2) in the rotation speed control mode, the torque of the starting element (6) and the torque of the clutch (5), which is positioned between the combustion engine (1) and the electric machine (2), determining a forward feed torque for the rotation speed control mode.

7. The method according to claim 5, further comprising the step of operating the electric machine (2) in a defined machine rotation speed in the rotation speed control mode, when the expected drive resistance is larger than the first threshold value and lower than the second threshold value, and
    with the combustion engine (1) turned off, disengaging the clutch (5), which is positioned between the combustion engine (1) and the electric machine (2), and the starting element (6) disengaged, and
    thereafter, engaging the starting element (6) in a way such that the starting element (6) transfers a start torque,
    monitoring whether the motor vehicle starts after a defined time interval, and
    then, if it is determined that the motor vehicle does not start, terminating the start procedure and executing a new start procedure with conditions which are applied when the expected drive resistance is larger than the second threshold value.

8. The method according to claim 5, further comprising the step of carrying out the starting procedure when the expected drive resistance is lower than the first threshold value, with the combustion engine (1) turned off, by utilizing the clutch (5) which is positioned between the combustion engine (1) and the electric machine (2), and the starting element (6) engaged, via the electric machine (2) from a standstill, and
    monitoring whether the electric machine (2) reaches a minimum rotation speed after a defined time interval, then terminating the start procedure, and
    executing a new start procedure under the conditions which are applied either when the expected drive resistance is larger than the first threshold value, but lower than the second threshold value, or if the expected drive resistance is larger than the second threshold value.

* * * * *